(12) United States Patent
Ahrens et al.

(10) Patent No.: US 9,317,355 B2
(45) Date of Patent: *Apr. 19, 2016

(54) DYNAMICALLY DETERMINING AN EXTERNAL SYSTEMS MANAGEMENT APPLICATION TO REPORT SYSTEM ERRORS

(71) Applicant: International Business Machines Corporation, Armonk, NY (US)

(72) Inventors: George H. Ahrens, Pflugerville, TX (US); Guoyou Chen, Austin, TX (US); Jacob Kugel, Rochester, MN (US); Sajan Lukose, Temple, TX (US); Rose B. Sundermeyer, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/291,586

(22) Filed: May 30, 2014

(65) Prior Publication Data

US 2015/0220379 A1 Aug. 6, 2015

Related U.S. Application Data

(63) Continuation of application No. 14/169,292, filed on Jan. 31, 2014.

(51) Int. Cl.
  *G06F 11/07* (2006.01)
(52) U.S. Cl.
  CPC ........ *G06F 11/0769* (2013.01); *G06F 11/0709* (2013.01); *G06F 11/0772* (2013.01)
(58) Field of Classification Search
  CPC ............ G06F 11/0772; G06F 11/0709; G06F 9/5077; G06F 9/45533; G06F 9/45558; G06F 11/0769
  See application file for complete search history.

(56) References Cited

U.S. PATENT DOCUMENTS

| 7,496,701 | B2 | 2/2009 | Crawford et al. |
| 8,224,937 | B2 | 7/2012 | Childress et al. |
| 8,539,285 | B2 * | 9/2013 | Daily et al. ..................... 714/48 |
| 2003/0163544 | A1 * | 8/2003 | Wookey et al. ............... 709/217 |
| 2011/0314339 | A1 | 12/2011 | Daily et al. |
| 2012/0110155 | A1 * | 5/2012 | Adlung et al. ................ 709/223 |
| 2013/0111037 | A1 | 5/2013 | Adlung et al. |
| 2014/0310706 | A1 | 10/2014 | Bruso et al. |
| 2015/0169372 | A1 * | 6/2015 | Salsburg et al. .................. 718/1 |
| 2015/0220380 | A1 | 8/2015 | Ahrens et al. |

OTHER PUBLICATIONS

U.S. Appl. No. 14/169,292, entitled "Dynamically Determining an External Systems Management Application to Report System Errors", filed Jan. 31, 2014.

* cited by examiner

*Primary Examiner* — Michael Maskulinski
(74) *Attorney, Agent, or Firm* — Patterson & Sheridan, LLP (57) ABSTRACT

Systems, methods, and computer program products to perform an operation comprising, responsive to an occurrence of an error on a computing system, selecting, based on one or more policy attributes, a first systems management application from a plurality of systems management applications registered to manage the computing system, generating an event notification including an identifier for the first systems management application, and transmitting the event notification to the first systems management application for reporting to a remote service.

7 Claims, 5 Drawing Sheets

DYNAMICALLY DETERMINING AN EXTERNAL SYSTEMS MANAGEMENT APPLICATION TO REPORT SYSTEM ERRORS

CROSS-REFERENCE TO RELATED APPLICATIONS

This application is a continuation of co-pending U.S. patent application Ser. No. 14/169,292, filed Jan. 31, 2014. The aforementioned related patent application is herein incorporated by reference in its entirety.

BACKGROUND

The present disclosure relates to computer software, and more specifically, to computer software to dynamically determine an external systems management application to report system errors.

When a computing system experiences a software or hardware error, the error and related data must be reported to a support entity. Software solutions have arisen to automatically report these errors. Problems may arise when multiple systems management applications manage the same computing system, as the applications need to coordinate and decide who is the "call-home owner," or the systems management application responsible for reporting the error to the support entity. Each systems management application may have its own algorithm used to determine whether it is the call-home owner, and these algorithms may not coordinate with each other, leading to conflicts. For example, one systems management application may determine if it is the call-home owner by checking if any other system has been set to call home the error—if no other system has taken responsibility, it will call home. Other systems management applications may forcedly take call-home responsibility. Therefore, in this scenario, if the latter systems management application forcedly takes the call-home responsibility, it may retain the responsibility until a user manually executes a command to change it.

SUMMARY

Embodiments disclosed herein include systems, methods, and computer program products to perform an operation comprising, responsive to an occurrence of an error on a computing system, selecting, based on one or more policy attributes, a first systems management application from a plurality of systems management applications registered to manage the computing system, generating an event notification including an identifier for the first systems management application, and transmitting the event notification to the first systems management application for reporting to a remote service.

DETAILED DESCRIPTION

Embodiments disclosed herein provide techniques to dynamically determine an external systems management application to report system errors. The selected external systems management application may be referred to as a "call-home owner." As used herein, a "call-home owner" refers to a system or software application responsible for reporting an error detected on a computing system to the appropriate support entity, such as the support department of a manufacturer of a product. Embodiments disclosed herein implement a standalone call-home coordinating engine running on a managed computing system. When the coordinating engine detects an error, or receives a notification that an error has occurred on the computing system, the coordinating engine may select a call-home owner from a group of management applications registered to manage the computing system. The coordinating engine 102 may then generate an event notification which includes a unique identifier of the selected call-home owner, and send the event notification to all subscribed management applications. When the management applications receive the event notification, each management application compares the unique identifier in the event notification to their respective management application identifier. If the identifiers match, the management application determines that it is the call-home owner, and may report the error to the appropriate entity. Any management application having an identifier not matching the identifier in the event notification does not report the error, but instead may display the error to a user.

Figure 1:
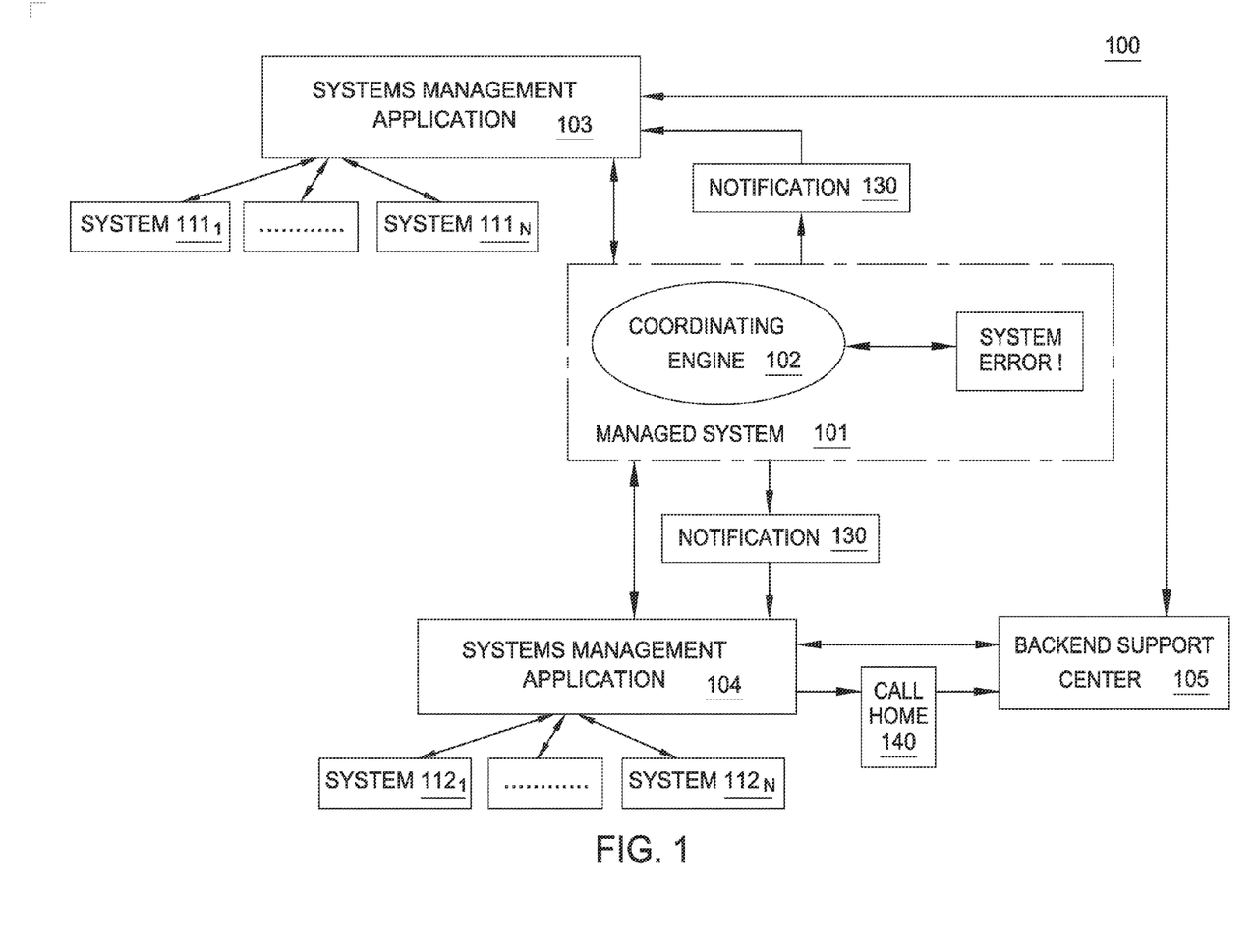
FIG. 1 illustrates a computing environment configured to dynamically determine an external systems management application to report system errors, according to one embodiment.

FIG. 1 illustrates a computing environment 100 configured to dynamically determine an external systems management application to report system errors, according to one embodiment. As shown, a managed system 101 includes a coordinating engine 102. The managed system 101, as well as systems $111_{1-N}$ and $112_{1-N}$ may be any computing system. The managed system 101 may be an individual endpoint system, or a collection of systems incorporating a management module. The coordinating engine 102 is an application executing on the managed system 101 that may detect errors or receive notifications of errors (and data related to the errors) on the managed system 101, and in response, select a systems management application external to the managed system 101 that should report, or "call-home" the error to a backend support center 105 of a service provider. The backend support center 105 may be configured to receive notifications that errors occurred on a computing system, which may trigger a workflow that leads to the service provider resolving the error. The systems $111_{1-N}$ and $112_{1-N}$ may also include the coordinating engine 102 (not pictured).

As shown, the computing environment 100 also includes systems management applications 103 and 104. Generally, the systems management applications 103, 104 are applications configured to manage endpoint systems. The systems management applications 103, 104 may receive event notifications (and related data) from one or more managed systems, such as the managed system 101 and the systems $111_{1-N}$ and $112_{1-N}$, and report the errors to the backend support center 105. When the managed system 101 experiences an error, which may include, without limitation, a software error, a firmware error, and a hardware error, the coordinating engine 102 may reference one or more policies (not shown) in order to select one of the systems management applications 103, 104 as the "call-home owner." In this example, the coordinating engine 102 may determine that the systems management application 104 is the call-home owner. The coordinating engine 102 may make this determination based on any number of policies, which include, without limitation, user-specified call-home owner priority rankings, the manufacturer of a component experiencing the error, a workload balance of each systems management application 103, 104, one or more features of each systems management application 103, 104 (such as whether the application forwards log files related to the system error included in the event notification 130), average historical response times for each systems management application 103, 104, a reliability score of each systems management application 103, 104 indicating whether the application successfully reported previous events, an availability of each systems management application 103, 104 (for example, whether the applications are currently reporting other events, downloading fixes, and the like), and a solution environment of the managed system 101.

When the coordinating engine 102 selects the systems management application 104 as the call-home owner, the coordinating engine 102 may generate an event notification 130 that includes a unique identifier of the selected call-home owner. The identifier may be, without limitation, an IP address or a host name of a machine hosting the selected management application. The notification 130 may include, without limitation, detailed information regarding the system error, the type of error, the source system name, and source system IP address. In at least some embodiments, the notification 130 includes a "snapshot" of the log files at the point in time the error occurred on the system 101. In other embodiments, after receiving the notification 130, the systems management applications 103, 104 may request and receive the log files from the system 101 regarding the error.

When the systems management applications 103, 104 receive the event notification 130, a designated component therein may compare the unique identifier of the systems management application to the unique identifier in the event notification 130. If the identifiers do not match, as in the case of systems management application 103, the systems management application 103 does not report an event notification to the backend support center 105, as the systems management application 103 is not the call-home owner. Instead, the systems management application 103 may take no action, or communicate the error to a user (via email, outputting for display on a monitor, or other communications means). If the identifiers match, as in the case of systems management application 104, the systems management application 104 determines that it is the call-home owner, which means it must report the error to the backend support center 105. The systems management application 104 may then connect to the managed system 101 in order to collect data related to the error, such as log files. The systems management application 104 may then send a call-home notification 140 to the backend support center 105. The call-home notification 140 may be a forwarded version of the event notification 130, or generated by the systems management application 104 according to a predefined format. The collected data may also be submitted along with the call-home notification 140. Once notified of the error, the backend support center 105 may take the appropriate steps in order to resolve the error. In addition, once the systems management application 104 "calls home" to the backend support center 105, it may send an acknowledgment to the coordinating engine 102 indicating that the error has been reported to the backend support center 105.

If the coordinating engine 102 does not receive an acknowledgement from the systems management application 104 within a predefined time threshold, the coordinating engine 102 may select a different call-home owner, such as the systems management application 103. The coordinating engine 102 may then generate an updated notification 130, which it may send to all systems management applications in the computing environment 100. The systems management application 103 may then attempt to report the problem to the backend support center 105. Generally, the coordinating engine 102 may select any number of systems management applications in the computing environment 100 to be the call-home owner until the coordinating engine 102 receives a notification indicating that the error was successfully reported to the backend support center 105.

Figure 2:
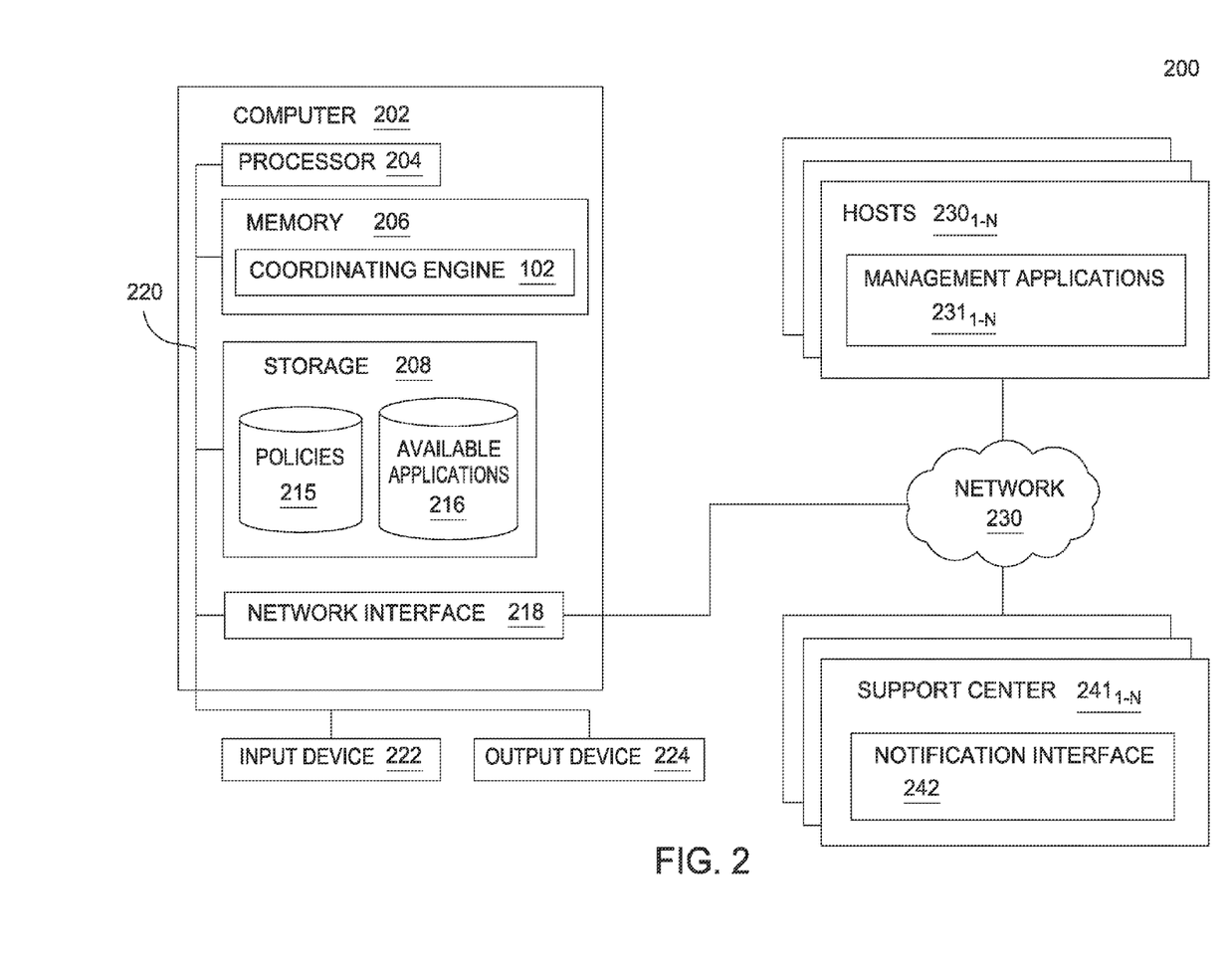
FIG. 2 illustrates a system to dynamically determine an external systems management application to report system errors, according to one embodiment.

FIG. 2 illustrates a system 200 to dynamically determine an external systems management application to report system errors, according to one embodiment. The networked system 200 includes a computer 202. The computer 202 may also be connected to other computers, such as the hosts $230_{1-N}$ and support center machines $241_{1-N}$ via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains the coordinating engine 102, which is an application generally configured to dynamically select an external systems management application to report errors (a call-home owner) occurring on the computer 102. In order to determine which of the management applications 231 on the hosts 230 should be the call-home owner for a given error, the coordinating engine 102 may reference one or more policies in the policies 215, which the coordinating engine 102 may apply to a list of available applications in the available applications 216. The policies 215 and the available applications 216 may both stored in the storage 208. The policies 215 may include one or more policies, rules, scores, or any other data that may assist the coordinating engine 102 to select a call-home owner. For example, the policies 215 may include user-defined rankings of each of the management applications 231, workload balance of each management application 231, one or more features of each management application 231 (such as whether the application forwards log files related to the system error), average historical response times for each systems management application 231, a reliability score of each systems management application 231 generated by the coordinating engine 102, and indications as to whether the application successfully reported previous events, and a solution environment of the computer 202. The reliability score of each management application 231 may be based on the rules and other factors in the policies 215, and how well each management application 231 performs according to these rules and factors.

When the coordinating engine 102 detects an error on the computer 202 (or receives a notification that an error has occurred), the coordinating engine 102 may select one of the management applications 231 as the call-home owner. The coordinating engine 102 may then generate an event notification including a unique identifier of the selected call-home owner and send it to each of the management applications 231 registered to manage the computer 202. In one embodiment, the coordinating engine 102 sends the event notification pursuant to the common information model object manager (CI-MOM) protocol, although any suitable communications protocol may be used. Upon receiving the event notification, each of the management applications 231 compares its own unique identifier to the identifier included in the event notification. If the identifiers match, the management application 231 determines that it is the call-home owner, and may notify the appropriate support center host 241 through a notification interface 242. In at least some embodiments, the management application 231 may connect to the system 202 to collect data related to the error prior to notifying the support center host 241. Additionally, upon successfully notifying the support center host 241, the management application 231 may notify the coordinating engine 102 of the successful call home. If the coordinating engine 102 does not receive a notification from the selected call-home owner specified in the initial event notification, the coordinating engine 102 may select new call-home owners and send updated notifications until receiving a notification that the error was successfully called home.

Figure 3:
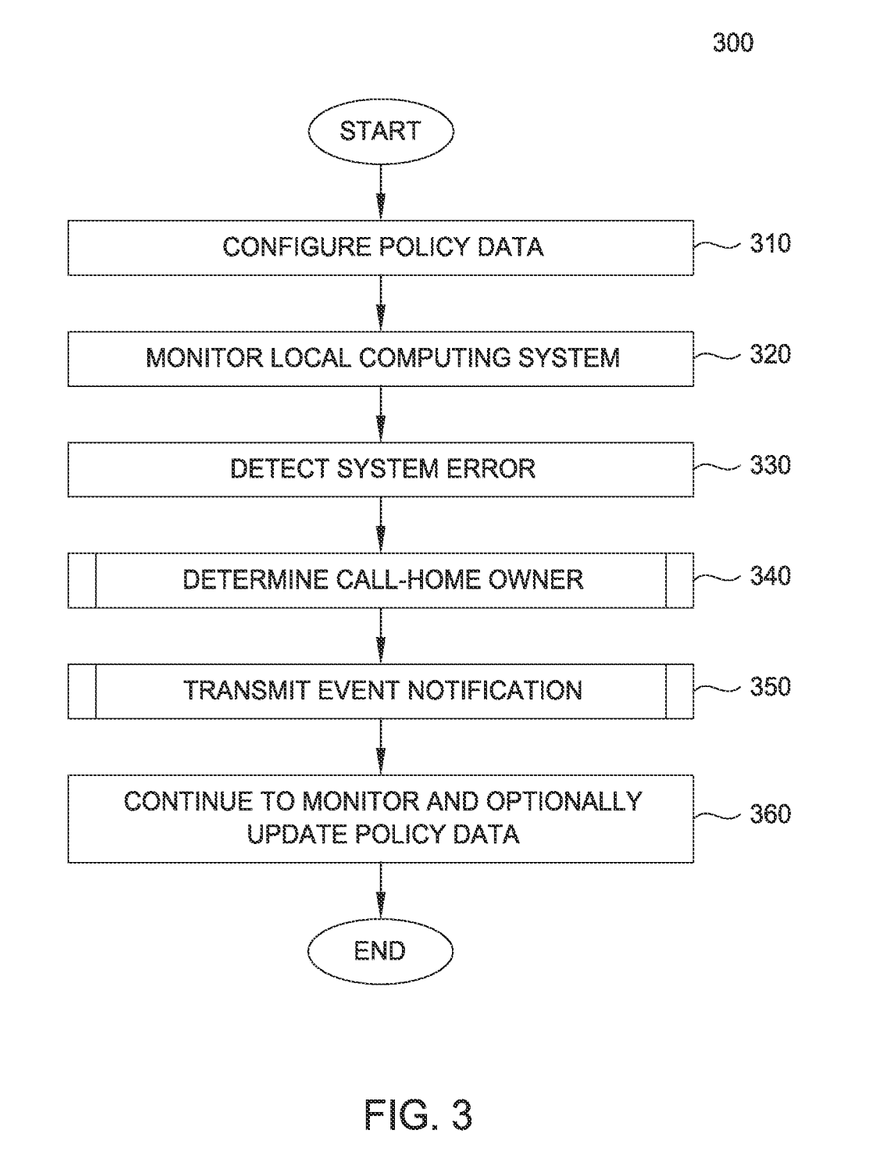
FIG. 3 is a flow chart illustrating a method to dynamically determine an external systems management application to report system errors, according to one embodiment.

FIG. 3 is a flow chart illustrating a method 300 to dynamically determine an external systems management application to report system errors, according to one embodiment. In at least one embodiment, the steps of the method 300 are performed by the coordinating engine 102. Generally, the steps of the method 300 allow a standalone host to dynamically select a call-home owner responsive to a system error, such that the selected call-home owner can send a notification to a support entity to have the error resolved. At step 310, the coordinating engine 102 (or a user) may configure the policy data in the policies 215. For example, the user may specify, for each available application in the available applications 216, a predefined priority ranking relative to one or more different types of system errors. The user may specify, for example, that vendor X's management application should be the call-home owner for any errors arising with a hard disk manufactured by vendor X. The user may also define other policies in the policies 215, based on any number of rules or criteria, such as historic response times for the management applications, and the like. Additionally, the policies may be pre-loaded in a firmware or via an application, and may be downloaded or imported.

At step 320, the coordinating engine 102, or a designated component of the computing system, monitors the local computing system for errors. At step 330, the coordinating engine 102 or the designated component detects a system error. When the error is detected, the coordinating engine 102 may connect to the system to collect data related to the error. At step 340, described in greater detail with reference to FIG. 4, the coordinating engine 102 determines a call-home owner for the error. At step 350, described in greater detail with reference to FIG. 5, the coordinating engine 102 transmits an event notification to all registered management applications configured to manage the local computing system. At step 360, the coordinating engine 102 continues to monitor the system, and may optionally update the policies in the policies 215. For example, the coordinating engine 102 may monitor performance data of each management application in order to determine their respective ability to take on the responsibility of calling home new errors. If the management application currently scored highest is under a heavy load, the coordinating engine 102 may lower the overall score of the management application such that it is no longer first in line to receive event notifications that it must call home. As another example, if the coordinating engine 102 determines that management application X has successfully reported only 10% of its received event notifications, the coordinating engine 102 may update the policies 215 such that application X is not selected as call-home owner as frequently.

Figure 4:
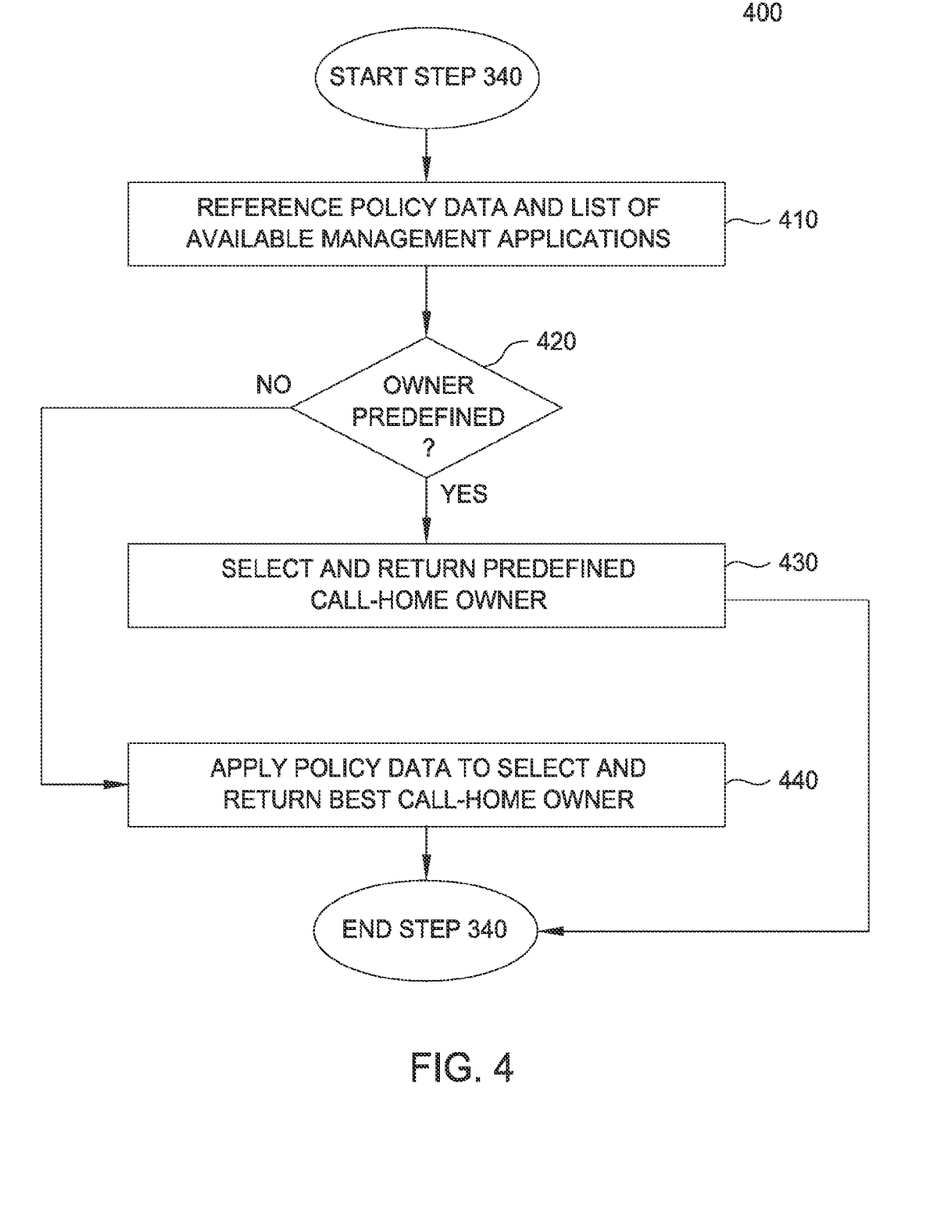
FIG. 4 is a flow chart illustrating a method to select a call home owner, according to one embodiment.

FIG. 4 is a flow chart illustrating a method 400 corresponding to step 340 to select a call home owner, according to one embodiment. In at least one embodiment, the coordinating engine 102 performs the steps of the method 400. Generally, the steps of the method 400 allow the coordinating engine 102 to select an application to serve as a call-home owner that will report information relating to a computing system error to the appropriate support entity. At step 410, the coordinating engine 102 may reference the policies 215 and the available management applications 216. Generally, the policies 215 include rules, predefined mappings between errors and management applications defined as call-home owners for those errors, and other data used by the coordinating engine 102 to determine which management application is the call-home owner of a given error. At step 420, the coordinating engine 102 determines whether a call-home owner for the detected error has been predefined. For example, a user may specify that motherboard errors should be directed to the manufacturer of the motherboard, while networking errors should be directed to a network administrator. If the call-home owner has been predefined, the coordinating engine 102 proceeds to step 430, where the coordinating engine 102 selects and returns the predefined call-home owner as the call-home owner. If the call-home owner is not predefined, the coordinating engine 102 proceeds to step 440, where the coordinating engine 102 applies the policy data in order to select and return the best-call home owner. In one embodiment, the coordinating engine 102 may score each available management application based on factors including, without limitation, prior success rates of calling home errors, features of the management application (such as the ability to forward log files when calling home the error), a current system resource utilization of the system hosting the management application, the current workload of the management application, and the like. Additionally, the coordinating engine 102 may select a set of specific criteria in the policy data in order to identify the best management application. For example, the coordinating engine 102 may select management application Y upon determining that management application Y has been observed to call home errors faster than any other management application. Once the coordinating engine 102 has identified a call-home owner for the error, the method 400 ends.

Figure 5:
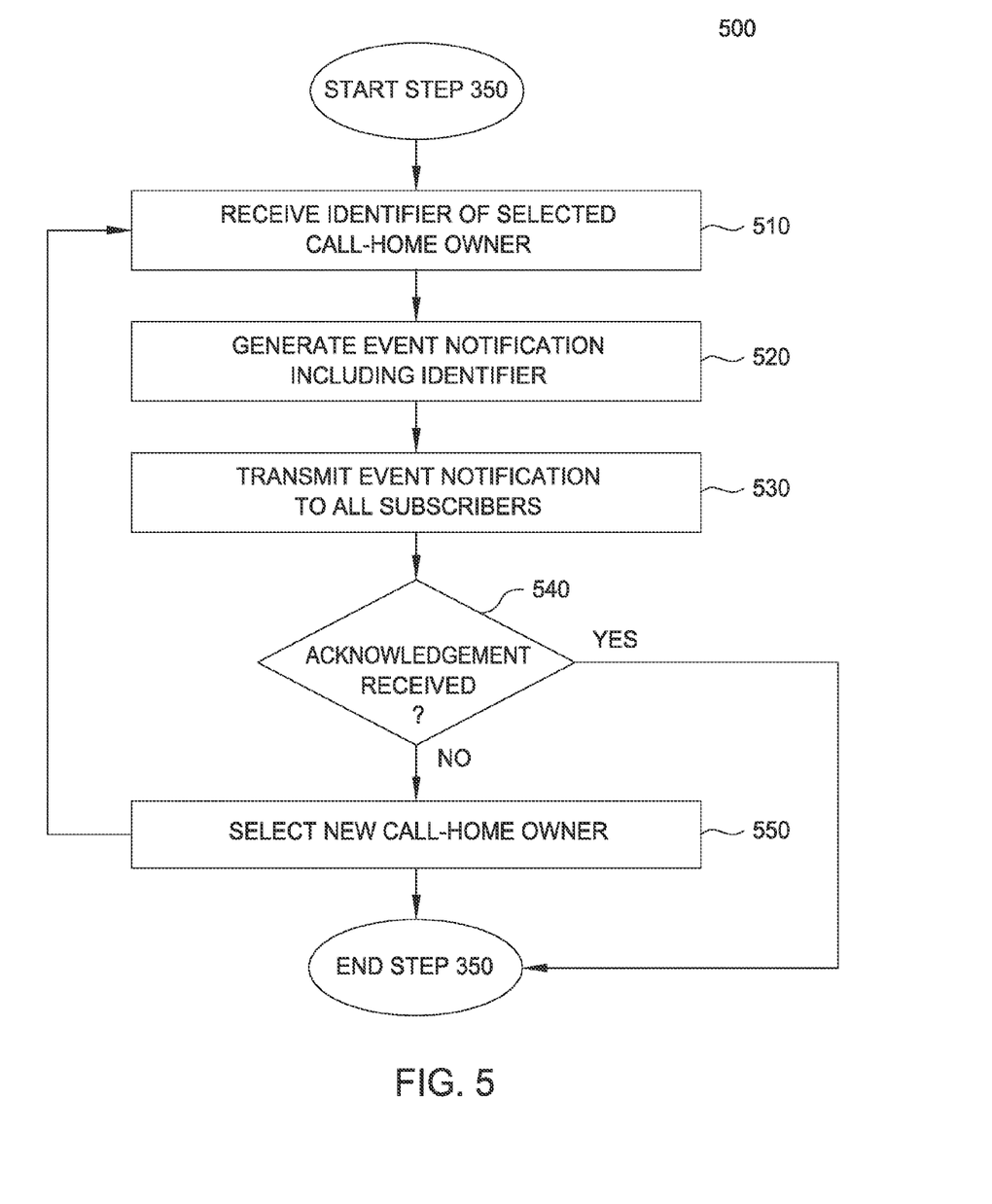
FIG. 5 is a flow chart illustrating a method to transmit an event notification, according to one embodiment.

FIG. 5 is a flow chart illustrating a method 500 corresponding to step 350 to transmit an event notification, according to one embodiment. In at least one embodiment, the coordinating engine 102 performs the steps of the method 500. Generally, the coordinating engine 102, in executing the steps of the method 500, generates one or more event notifications that are sent to all subscribed management applications until the coordinating engine 102 receives an indication that the selected call-home owner has successfully reported the error. At step 510, the coordinating engine 102 may receive an identifier of the selected call-home owner. The identifier may include, without limitation, a hostname or an IP address associated with the selected call-home owner. The identifier may be stored in the management applications 216 as metadata associated with each management application, or the coordinating engine 102 may receive the identifier directly from the management application itself. At step 520, the coordinating engine 102 may generate an event notification including the received identifier. The event notification may include, without limitation, log files, information about the error, any affected hardware and/or software, the computing system experiencing the error, and the like. At step 530, the coordinating engine 102 may transmit the event notification to all subscribed management applications. When each management application receives the event notification, the management application may perform a comparison of its unique identifier to the identifier in the event notification. If the identifiers match, the management application may determine that it is the call-home owner, and attempt to report the error to the appropriate support entity. If the error is successfully called home, the management application may send an acknowledgment or other indication to the coordinating engine 102 in order to inform the coordinating engine 102 that the error has been reported. At step 540, the coordinating engine 102 may determine whether the acknowledgement is received. The coordinating engine 102 may wait a predefined period of time before selecting a new call-home owner in order to have the error reported. If the coordinating engine 102 receives the acknowledgement, the method 500 ends. In some embodiments, the selected call-home owner's attempt to transmit the error information may fail. In such cases, the call-home owner may send a failure notification to the coordinating engine 102, such that the coordinating engine 102 need not wait for the time-out period to pass prior to selecting a new call-home owner. If the coordinating engine 102 does not receive an acknowledgement within a predefined period of time (or receives a failure notification), the coordinating engine 102 may select a new call-home owner at step 550. Once the new call-home owner is selected, the coordinating engine 102 may return to step 510 in order to generate an updated notification to send to all subscribed management applications. The coordinating engine 102 may repeat the steps of the method 500 until it receives an acknowledgement that the error was successfully called home.

Advantageously, embodiments disclosed herein dynamically select respective call-home owners for different system errors. A local system agent or service may detect errors (or receive notifications that an error has occurred), apply one or more policies and rules that may be specific to each error and management application, and select a management application as the call-home owner. If the local system agent or service does not receive a timely acknowledgment, it may select a "next-in-line" management application to call the error home, ensuring that the error is properly reported to a system support entity.

Although embodiments disclosed herein use system errors as a reference example, embodiments of the disclosure may apply equally to reporting any type of information, and the user of system errors should not be considered limiting of the disclosure. For example, and without limitation, embodiments disclosed herein may be used to report performance information, inventory information (such as installed software and device drivers), and heartbeat information to a service provider.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the coordination engine 102 could execute on a computing system in the cloud and dynamically determine a call-home owner. In such a case, the coordination engine 102 could transmit event notifications and store policy data at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
responsive to an occurrence of an error on a computing system, selecting, based on one or more policy attributes, a first systems management application from a plurality of systems management applications registered to manage the computing system;
generating an event notification including an identifier for the first systems management application; and
transmitting the event notification to the first systems management application for reporting to a remote service.

2. The method of claim 1, wherein more than one of the plurality of systems management applications are capable of reporting the event notification to the remote service, wherein the policy attributes comprise: (i) a manufacturer of a component experiencing the error, (ii) a workload balance of each systems management application, (iii) user-specified selection policies, (iv) one or more features of each application, (v) average historical response times for each systems management application, (vi) a reliability score of each application indicating whether the systems management application successfully reported previous events, (vii) an availability of each systems management application, and (viii) a solution environment of the computing system.

3. The method of claim 1, wherein the event notification is transmitted to each of the plurality of systems management applications, wherein each of the plurality of systems management applications is associated with a respective identifier, wherein each of the plurality of systems management applications does not report the event notification unless the identifier included in the event notification matches the respective identifier.

4. The method of claim 1, further comprising:
upon determining that an acknowledgement has not been received from the first systems management application within a predefined time threshold:
selecting a second systems management application, of the plurality of systems management applications; and
transmitting an updated event notification including an identifier of the second systems management application to the second systems management application for reporting.

5. The method of claim 1, wherein a systems management engine executing on the computing system selects the systems management application, generates the event notification, and transmits the event notification.

6. The method of claim 5, wherein the systems management engine is configured to, responsive to an occurrence of a plurality of errors:
select, based on the one or more policy attributes, a respective systems management application for each of the plurality of errors;
generate an event notification for each of the plurality of errors, each notification including an identifier of each respective selected systems management application; and
transmit each event notification to each of the systems management applications.

7. The method of claim 1, wherein the identifier comprises one of: (i) an IP address, and (ii) a hostname of the first systems management application, wherein the plurality of systems management applications execute external to the computing system.

* * * * *